Jan. 22, 1963  H. C. WARD, JR  3,075,103
FLUID COOLED CHILL RING FOR CANNED MOTORS
Filed Sept. 30, 1959
2 Sheets-Sheet 1

INVENTOR.
HOWARD C. WARD JR.
BY James R Campbell
ATTORNEY

Jan. 22, 1963 H. C. WARD, JR 3,075,103
FLUID COOLED CHILL RING FOR CANNED MOTORS
Filed Sept. 30, 1959
2 Sheets-Sheet 2

INVENTOR.
HOWARD C. WARD JR

BY *James R. Campbell*

ATTORNEY

United States Patent Office 3,075,103
Patented Jan. 22, 1963

3,075,103
FLUID COOLED CHILL RING FOR
CANNED MOTORS
Howard C. Ward, Jr., Schenectady, N.Y., assignor to General Electric Company, a corporation of New York
Filed Sept. 30, 1959, Ser. No. 843,567
4 Claims. (Cl. 310—54)

The invention described herein relates to dynamoelectric machines and more particularly to an improved arrangement for cooling enclosed end turns in canned motors.

Canned motors are finding increased use in fluid circulating systems wherein high temperature fluids are circulated at high pressures for satisfying the demands of equipment used in the system. These motors generally comprise a rotor having a stainless steel cylinder shrunk onto its outer surface and a similar cylinder welded to the inner surface of a stator core, the arrangement being such that when the motor is placed in operation, the motor air gap is formed by the concentric cylinders respectively secured to the magnetic cores.

The stator winding end turns project outwardly from the core in the usual manner and are enclosed within heavy structural members which not only withstand radial directed forces presented by high pressure water circulated through the air gap, but also provides a water tight construction for the current carrying parts. As a result, the end turns operate at a considerably higher temperature than the slot portions of the coils positioned in the magnetic core. To overcome the problems associated with such high temperatures, many different designs have been resorted to for transferring heat from the end turns to an area of lower temperature. In one prior art design, the end turns are embedded or encapsulated in a resinous composition having copper-shot filler of high thermal conductivity for transmitting heat by conduction from the end turns to the cylindrical stator can which is in contact with water circulated through the air gap. The primary disadvantages of this construction is that the resinous composition cracks when subjected to thermal cycling which takes place during motor operation. It also is difficult to remove the composition when damaged coils in the machine must be repaired or replaced. Oil has been suggested as a medium for carrying away end turn heat, but experience has shown that in the event of structural failure of the stator can, oil is then intimately mixed with the fluid circulating through the air gap.

The copending patent applications of J. J. Broderick and M. E. Petersen, Serial No. 771,474, filed November 3, 1958, and R. O. Eis and C. F. Howard, Serial No. 783,392 filed November 29, 1958, both of which are assigned to the same assignee of the present invention, disclose constructions which effectively carry away heat generated by the end turns during operation. The inventive improvements in these applications however, are located within the end turn cavity, whereas heat removal may be accomplished also by utilizing external heat exchangers.

Present practices already include wrapping a pipe or tube on the outside surface of a cylindrical pressure vessel which encloses the stator. An outer shell then encloses this tube type heat exchanger and a liquid, preferably water, is circulated both through and around the tubes of the heat exchanger for absorbing heat generated by the motor.

In the usual case, such motors are mounted in a vertical position with a pump connected to the lower end thereof. The heavy structural flanges and other members necessary for providing connection between the pump and motor preclude extending the tube heat exchanger into the lower portions of the pressure shells where the lower end turns are located. This area normally is at a higher temperature than other portions of the machine because heat from the high temperature liquid circulated by the pump gravitates upward through the steel castings to the areas of lower temperature adjacent the heat exchanger. Since the enclosed end turns are located between the heat exchanger and pump, little opportunity is presented for effectively dissipating end turn heat, thus placing restrictions on operation of the motor.

In carrying out my invention, I minimize the disadvantages of the prior art constructions by locating a heat exchanger in the lower heavy flanges of the motor and in a position radially outward from the lower end turns. In its preferred form, this heat exchanger is formed by parallel grooves machined in the inner surface of a pressure vessel which surrounds the stator core and the end turns. The grooves are joined by appropriately spaced water inlet and outlet manifolds. To provide for water tight integrity, and to form passageways for circulation of a cooling liquid, a thin cylinder is fitted into the pressure vessel and its outer surface is arranged to contact lands in the vessel resulting from the groove machining operation. A plurality of passageways are thus formed by walls of the grooves and those portions of the cylinder which close the groves after it is secured in position. Since the cylinder inner surface is exposed to the end turn heat, rapid dissipation thereof through the cylinder to the heat exchanger is accomplished very effectively.

While the specification concludes with claims particularly pointing out and distinctly claiming the subject matter which I regard as my invention, it is believed the invention will be better understood from the following description taken in connection with the accompanying drawings in which:

Figure 1:
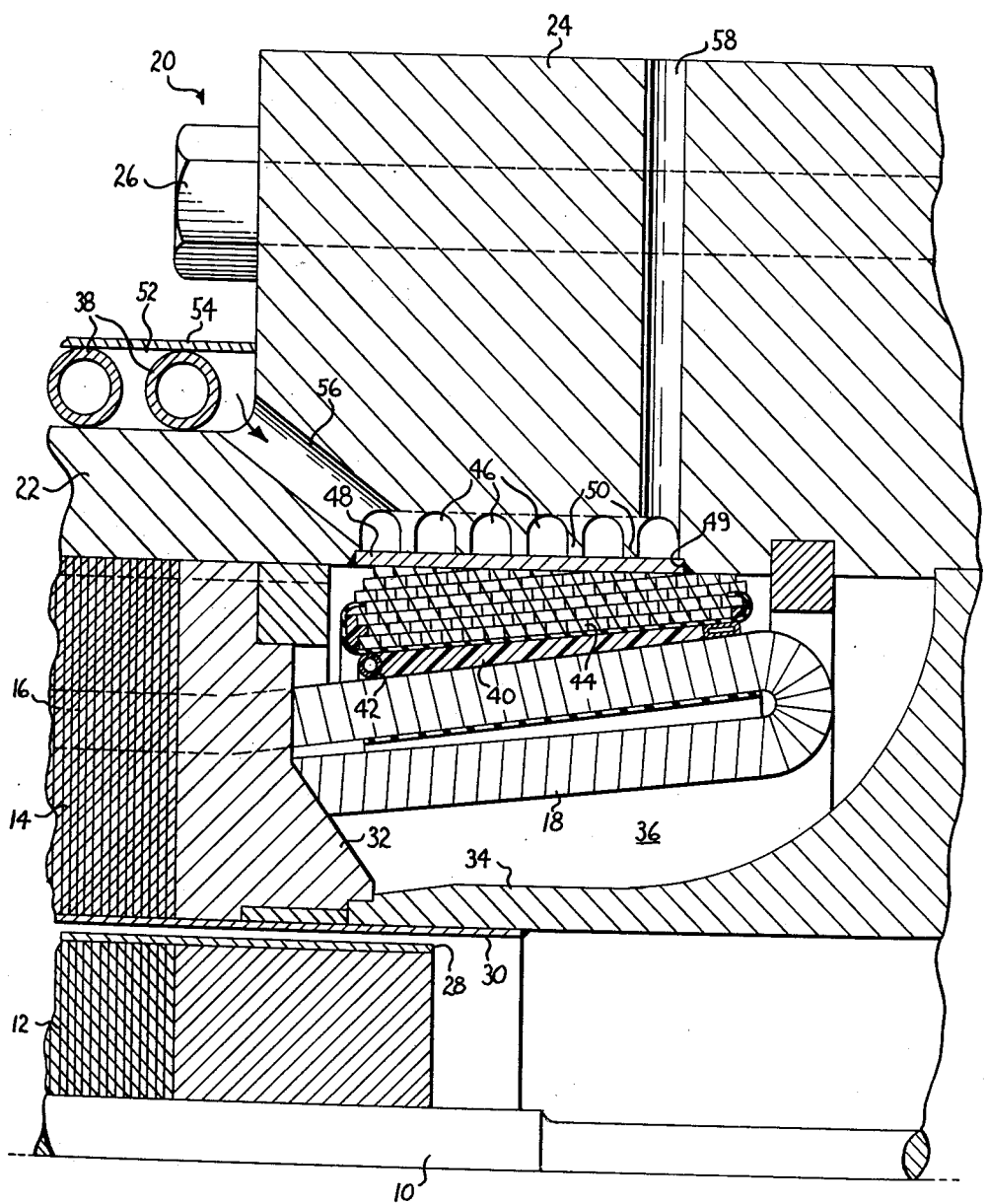
FIGURE 1 is a view in elevation, partly in section, of a portion of a motor illustrating the disposition of winding end turns and the heat exchanger used for transferring heat from the end turns to a circulating liquid.

Referring now to the drawings wherein like reference characters designate like or corresponding parts throughout the several views there is shown in FIGURE 1, the end portion of a motor comprising a shaft 10 supporting a plurality of rotor laminations 12 having conductors therein in the usual manner. A stator 14 comprising a similar set of laminations is positioned for electrodynamic cooperation with the rotor and is equipped with conductors 16 having end turns 18 which project outwardly from the stator core. The stator is enclosed within a pressure vessel 20 consisting essentially of a heavy steel casting having side walls 22 and terminating at its lower end, when positioned vertically, in a flange 24. As shown, the flange is equipped with bored openings for receiving a plurality of bolts 26 which connects the motor with a pump housing containing elements used in circulating a high temperature fluid through a heat generating system.

Each of the rotor and stator is equipped with stainless steel cylinders or cans 28 and 30 which are respectively shrunk on the rotor and welded to the inner portions of the stator, the arrangement being such that when the motor is placed in operation, liquid under a high temperature and pressure is circulated between the cylinders 28 and 30 which constitute the motor air gap. Since the liquid pressures in the air gap range upwardly to about 4500 p.s.i., heavy structural members must be provided to absorb radially directed forces which would otherwise cause structural failure of the cylinders. Accordingly, a circular finger flange 32 and a trapezoidal shaped ring 34 are positioned between the pressure vessel wall 22 and an extension of the stator bore in such a manner as to provide coacting parts capable of withstanding the outwardly directed forces. It will be seen that the construction of these parts provides a dead air space 36 in which the stator winding end turns 18 are located.

During operation of the machine, with a pump connected to the lower or right side of the motor as viewed in FIGURE 1, heat from the liquid circulated by the pump gravitates towards the left and through the flange portion 24 of the pressure vessel where it is ultimately carried away by a liquid circulated through an externally mounted heat exchanger 38 in a manner well known in the art. As a result of the relatively high temperature existing in flange portion 24, it is difficult to accomplish removal of heat from the end turns 18. The fact that the end turns also are located in a dead air space contributes substantially to the problem of dissipating the end turn heat during operation.

To overcome this basic problem of carrying away heat from the end turns, Eis and Howard have proposed in the application mentioned above, an arrangement of the type shown in section in FIGURE 1 wherein a resinous composition 40 including a magnesium oxide or other filler is positioned concentrically on the end turns and is enclosed by confining elements 42 positioned on opposite ends thereof. A chill ring 44 comprising a plurality of turns of rectangular shaped copper wire is wrapped on the exposed portions of the composition 40 until the diameter is equal to that of the outer periphery of the stator. By utilizing a construction of this type, heat from the end turns is transmitted by conduction through the resinous mass and highly conductive copper of the chill ring toward the outer portions of the machine where it is carried away by liquid circulated in a tube heat exchanger. Obviously other types of chill rings may be used for transferring heat from the end turns to the outer walls of the machine.

The improvement in this invention consists of providing a heat exchanger in the inner surface of the pressure vessel 20, such that the only member through which end turn heat must pass is a thin metallic cylinder of steel or other suitable material capable of performing the same functions as a steel cylinder. In its most simplest form, this is accomplished by machining a plurality of helical grooves or channels 46 in the inner surface of the flange portion 24 directly outward of the winding end turns. Each groove is machined to a depth and width sufficient to adequately handle an amount of liquid necessary for effectively cooling this portion of the stator. The grooves may assume any pattern required to obtain optimum cooling characteristics, as more fully described hereinafter.

The grooves or channels 46 are open on one side because of the machining operation and in order to form closed passages for circulation of the coolant, a cylinder 48 of steel or other suitable material capable of performing the same functions as a steel cylinder is located in an offset portion or shoulder 49 formed in the flange inner peripheral surface and then welded in position. Lands 50 located between each of the grooves, not only serve as a support for the cylindrical shell, but also is capable of absorbing any outwardly directed forces to which the shell may be subjected.

With the parts machined and assembled in this manner, coolant is provided to the grooves or closed passages 46 from a chamber 52 in which the tube type heat exchanger 38 is located. Since the liquid within the latter is at a relatively high temperature, supplemental cooling thereof is accomplished by circulating a liquid through the chamber 52 which is closed by a plate 54 welded to the pressure vessel 20. The supplemental source of coolant is utilized in this invention by directing the liquid through a bored inlet 56 in communication with the grooves or passages 46 in the flange 24. Discharge from the grooves may be accomplished by providing a passageway 58 bored or otherwise formed in the flange portion 24.

When the motor is placed in operation, heat from the motor parts, as well as that flowing toward the motor from the high temperature liquid circulated by the pump, must be absorbed by heat exchange mediums. In the average canned motor installation, this is accomplished by circulating a coolant through the motor air gap and mounting a heat exchanger on the outer surface of the pressure vessel. However, since the end turns are located in a dead air space, heat cannot be dissipated therefrom in the desired quantities, and generally, the end turn temperature therefore places severe limitations on the motor rating. The use of the Eis and Howard chill ring helps to keep the end turns at a lower temperature than other constructions, but the heat still must travel through the thick flange 24 before reaching the heat exchanger. By practicing this invention, the heat exchanger is located in an area adjacent the end turns, which is non-existent in any other known system, thereby making it accessible to the end turn heat which is conducted through the chill ring. Moreover, the thin walls of cylinder 48 offers only minimum resistance to transfer of heat from the chill ring to the groove-type heat exchanger. Therefore, when the motor operates, the end turn temperature is maintained at a lower value because heat generated therein is transmitted readily through the chill ring and walls of the cyilnder prior to being contacted by the circulating coolant in the groove-type heat exchanger.

Although the chill ring is important in the species disclosed herein, it may be eliminated in certain types of machines and heat still will be rapidly dissipated from the end turns because the difference in temperature levels between the cylinder inner surface and the end turns will impart circulatory movement to the air in the enclosed end turn space. Much of the heat will be delivered to the heat exchanger by convection under these circumstances.

Although the heat exchanger is disclosed as obtaining its source of coolant from chamber 52, it will be evident that tubes 38 may be connected directly to the grooves 46 or a separate source of supply may be delivered to grooves 46 through pipes or other conventional equipment. However, the tubes 38 carry liquid under the same pressure as that existing in the air gap and the cylinder 48 may require reinforcement or be made of heavier material to prevent its buckling when subjected to such high pressures.

In view of the effectiveness of this type heat exchanger in removing heat from the area of stator end turns, it is apparent that the grooves may be extended along the complete length of the pressure vessel inner surface for absorbing heat from both the stator core and the winding end turns on each end thereof. Obviously, a longer cylinder would be needed to close the grooves but two major advantages would be achieved. First, the heat exchanger would be located in close proximity to the heat source where heat could be imparted to the coolant by radiation and conduction, and second, use of the externally mounted tube-type heat exchanger could be eliminated. Since the amount of heat generated by different size machines vary, the grooves accordingly could be made shallow or deep, depending on the coolant flow required for maintaining the machine at reasonable temperature levels.

Figure 2:
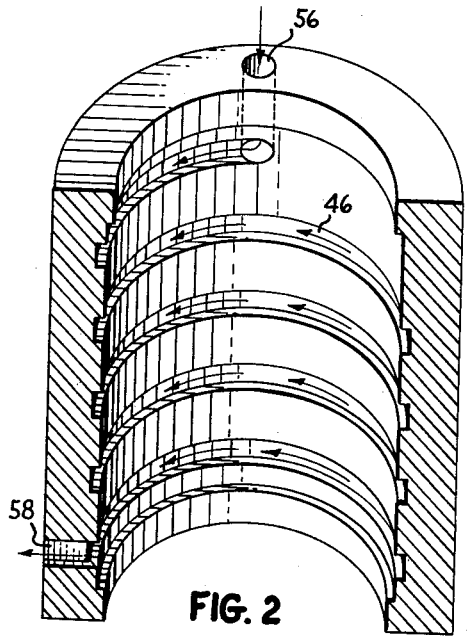
FIGURE 2 is a sectional view in elevation of a portion of a pressure vessel showing the disposition of grooves formed therein for receiving a liquid used for carrying away heat generated by the machine.

However, the primary objective of this invention is to provide means for reducing the machine temperature in the area of he lower end turns, and the groove arrangement used for this purpose may assume many different configurations, depending on the cooling and manufacturing cost requirements. The sectional view of a portion flange 24 shown in FIGURE 2 illustrates one arrangement wherein substantially semi-circular grooves 46 are machined or otherwise formed on the inner peripheral surface of the pressure vessel and in a position directly opposite from where the stator end turns will be located. In this embodiment, the grooves assume the shape of a helix and are continuous throughout their length, thereby providing a single uninterrupted passage from the inlet 56 to the outlet 58. When cylinder 48 is fitted into the offset portion furnished on the pressure vessel inner surface and welded in place (not shown in FIGURE 2), the cylinder outer surface engages and is placed in intimate contact with lands 50 formed by the groove machining operation. At this time, the grooves are completely closed to form the single continuous passage and leakage between grooves does not take place because of the close fitting cylinder. Although semi-circular grooves are shown, it is evident that grooves of other designs may be used, such as rectangular, triangular, elliptical, and the like.

Figure 3:
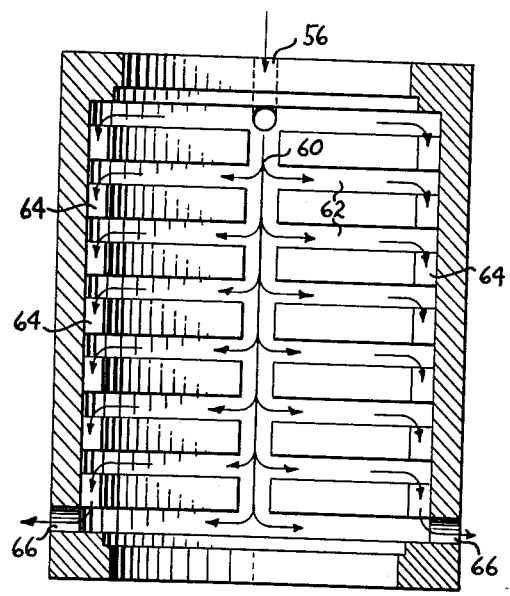
FIGURE 3 is the preferred modification illustrating different liquid circulating paths for a cooling liquid used in the pressure vessel.

When coolant is circulated through the passages formed by the coacting grooves and cylinder, the temperature thereof will gradually increase until a maximum is reached at the outlet 58. In some instances, it is preferable to maintain a more consistent temperature throughout the heat exchanger and this readily may be accomplished by the design illustrated in FIGURES 3 and 4, which is the preferred embodiment. As shown in FIGURE 3, the inlet 56 communicates with a vertically disposed manifold 60 which feeds coolant into transverse grooves 62 extending in opposite directions from the manifold. Discharge manifolds 64 are located on adjacent sides of the inlet manifolds 60, and receive the now heated coolant in the manner shown, prior to discharge through outlets 66. It will be evident that the extensive distribution of coolant permits a more effective means of cooling than otherwise could be obtained by virtue of the use of the inlet and discharge arrangement shown in FIGURE 2. The liquid may be discharged from a single or opposite ends 66 and it will be understood that a second inlet 56 preferably will be located on the opposite side of the pressure vessel for supplying coolant to the grooves or passages on that side.

Figure 4:
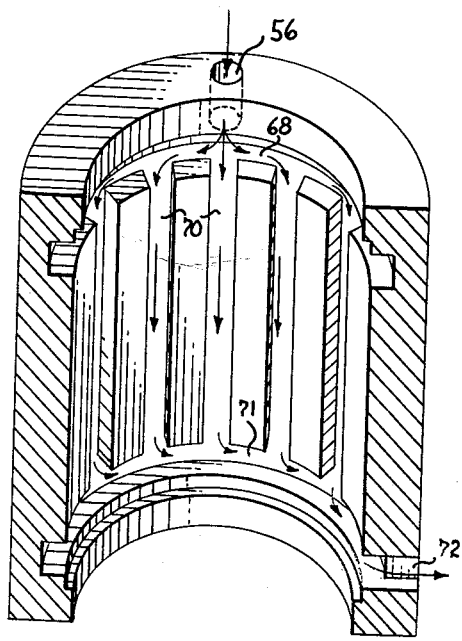
FIGURE 4 is another modification of the groove arrangement shown in the pressure vessel of FIGURE 2.
Figure 5:
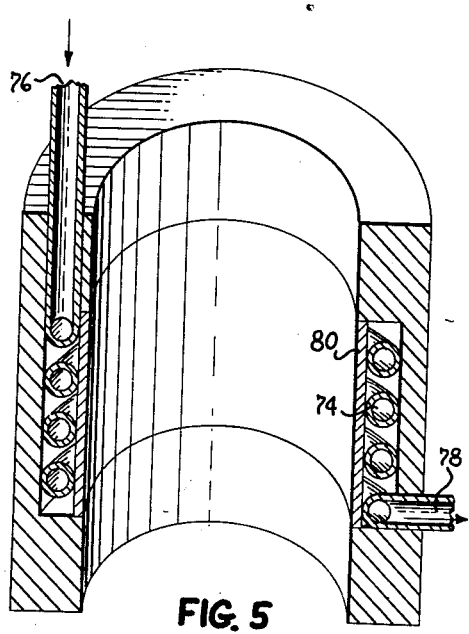
FIGURE 5 is still another modification showing the use of a tube type heat exchanger in the pressure vessel.

In the embodiment of FIGURE 4, a manifold 68 is provided at the top of the pressure vessel, as viewed in this figure, and permits coolant to be circulated through the vertically disposed passages 70 formed on the inner wall surfaces of the pressure vessel. An outlet manifold 71 at the bottom of the pressure vessel collects the heated coolant and discharges it through outlet 72 bored or otherwise formed in the pressure vessel.

In lieu of providing a multitude of gooves in the inner surface, a large area may be machined out of the pressure vessel and a conventional tube type heat exchanger 74 having an inlet 76 and an outlet 78 may be fitted therein. In order to isolate the heat exchanger 74 from the end turn cavity, a cylindrical shell 80 may be located within the pressure vessel body as in the previous modifications. In lieu of a cylindrical shell, the space between adjacent turns of the heat exchanger may be filled with a metallic or resin compound capable of sufficiently conducting heat to the heat exchange tubes.

In view of the above, it will be evident that many modifications and variations are possible in light of the above teachings. For example, any number of inlets and outlets may be used according to the heat dissipation requirements for the machine. Also, it will be apparent that any type of coolant may be used, such as gas or water, or other medium capable of absorbing heat transmitted through the walls of the cylinder 48. It therefore is to be understood that within the scope of the appended claims, the invention may be practiced other than as specifically described.

What I claim as new and desire to obtain by Letters Patent of the United States is:

1. A cooling arrangement for dynamoelectric machines comprising a rotor and a stator having a winding therein including end turns projecting outwardly from opposite ends of the stator, a pressure vessel enclosing said stator and of a length greater than the stator axial length, a plurality of grooves in said vessel and located radially outward from the end turns on at least one end of the stator, said grooves extending an axial distance substantially the same as said end turn length, a cylindrical member positioned in said vessel and having its outer surface coacting with walls forming said grooves for providing closed passages, and an inlet and outlet connected with said passages for circulating a fluid through the heat exchanger used in absorbing heat generated by the end turns during machine operation.

2. A cooling arrangement for a dynamoelectric machine comprising a rotor and a stator having a winding therein including end turns projecting outwardly from opposite ends of the stator, a pressure vessel enclosing said stator and terminating at one end in a coupling flange, said flange being located radially outward from the end turns on one end of the stator, a heat exchanger in said flange comprising an area carved out of the inner surface of the flange facing the end turns, a cylindrical member closing said carved out area, and an inlet and an outlet connected with said heat exchanger for permitting circulation of a fluid therethrough for carrying away heat generated by said machine during operation.

3. The combination according to claim 2 including a ring comprising a material of high heat conductivity bridging the space between the end turns and said cylindrical member for facilitating the transfer of heat from the end turns to the heat exchanger.

4. The combination according to claim 2 wherein a second heat exchanger is mounted on the outer surface of said pressure vessel and extending a length at least equal to the axial length of the stator for absorbing heat transmitted outwardly from the stator during machine operation.

References Cited in the file of this patent

UNITED STATES PATENTS

| 1,384,865 | Shepherd | July 19, 1921 |
| 2,462,451 | Winther | Feb. 22, 1949 |
| 2,894,155 | Lambastie | July 7, 1959 |
| 2,915,656 | Schwan | Dec. 1, 1959 |

FOREIGN PATENTS

| 109,294 | Great Britain | Sept. 5, 1917 |
| 761,437 | France | Jan. 5, 1934 |
| 792,536 | Great Britain | Mar. 26, 1958 |